(12) United States Patent
Zahid

(10) Patent No.: US 12,450,721 B2
(45) Date of Patent: Oct. 21, 2025

(54) DETECTING ROOF LEAKS

(71) Applicant: Alarm.com Incorporated, Tysons, VA (US)

(72) Inventor: Husham Zahid, Herndon, VA (US)

(73) Assignee: Alarm.com Incorporated, Tysons, VA (US)

(*) Notice: Subject to any disclaimer, the term of this patent is extended or adjusted under 35 U.S.C. 154(b) by 422 days.

(21) Appl. No.: 17/674,951

(22) Filed: Feb. 18, 2022

(65) Prior Publication Data

US 2022/0270230 A1 Aug. 25, 2022

Related U.S. Application Data

(60) Provisional application No. 63/153,083, filed on Feb. 24, 2021.

(51) Int. Cl.
*G06T 7/10* (2017.01)
*G06T 7/00* (2017.01)

(52) U.S. Cl.
CPC .... *G06T 7/001* (2013.01); *G06T 2207/30184* (2013.01)

(58) Field of Classification Search
CPC ........... G06T 7/001; G06T 2207/20084; G06T 2207/30184
See application file for complete search history.

(56) References Cited

U.S. PATENT DOCUMENTS

| | | | | |
|---|---|---|---|---|
| 9,152,863 B1* | 10/2015 | Grant | | G06Q 10/20 |
| 10,635,903 B1* | 4/2020 | Harvey | | G06T 7/0002 |
| 2015/0070181 A1* | 3/2015 | Fadell | | G08B 21/22 |
| | | | | 340/628 |
| 2019/0238796 A1* | 8/2019 | Allen | | G06T 7/0008 |
| 2020/0134573 A1* | 4/2020 | Vickers | | G06F 16/29 |
| 2021/0074139 A1* | 3/2021 | Sulucz | | G08B 17/125 |
| 2021/0102861 A1* | 4/2021 | Ellis | | G01M 3/16 |
| 2022/0254004 A1* | 8/2022 | Shayne | | G06T 7/001 |

* cited by examiner

*Primary Examiner* — Andrew W Bee
*Assistant Examiner* — D J Dhooge
(74) *Attorney, Agent, or Firm* — Fish & Richardson P.C.

(57) ABSTRACT

Methods, systems, and apparatus, including computer programs encoded on a computer storage medium, for detecting roof leaks. The methods, systems, and apparatus include actions of obtaining an indication that precipitation is forecasted to occur at a particular time at a property, obtaining, before the particular time, a first image of a ceiling of an attic of the property, obtaining, after obtaining the first image, a second image of the ceiling of the attic of the property, and detecting, based on differences between the first image and the second image, a water leak at the property.

20 Claims, 4 Drawing Sheets

DETECTING ROOF LEAKS

CROSS-REFERENCE TO RELATED APPLICATIONS

This application claims the benefit of U.S. Provisional Application No. 63/153,083, filed Feb. 24, 2021, which is incorporated by reference in its entirety.

TECHNICAL FIELD

This disclosure application relates generally to property monitoring systems.

BACKGROUND

Roof leaks can lead to significant costs, especially if they are detected late. As time passes, an unfixed or undetected leaking roof can lead to significant damages, such as rotten and molded dry walls, ceilings, and insulation. One method to identify a leaking roof is to climb on top of the property and to inspect the roof from outside. Another method to identify a leaking roof is to notice the moisture build-up (e.g., wet or dark spots) in either the attic or the ceiling of a room. However, most people cannot easily inspect the roof from outside, and do not regularly check their attic or ceiling for roof leaks. Therefore, there exists the risk of delaying the detection of a roof leak and the fix of the roof leak.

BRIEF DESCRIPTION OF THE DRAWINGS

Like reference numbers and designations in the various drawings indicate like elements.

DETAILED DESCRIPTION

The disclosed systems, methods, and techniques relate to roof leaks detection based on the surrounding environment and commands from a property monitoring system. In general, during a precipitation event, e.g., a raining event, water droplets, wet spots, or dark spots can appear on a ceiling if outside water leaks through a roof leak spot. Sensors of the property monitoring system may gather sensor data and analyze the sensor data to detect roof leaks. For example, one or more cameras installed in an attic of a property can be automatically triggered before and after a predicted precipitation event. These sensors can be used on-demand, periodically, or on a continuous basis. The system can detect roof leaks by analyzing the sensor data, e.g., an image or a video of a ceiling captured during the precipitation event.

The system can detect one or more potential roof leaking spots by comparing and analyzing the images captured by the one or more cameras. The system can provide an alert to a user of the property that one or more potential roof leaking spots have been detected, and the user can fix the potential roof leaking spots after receiving the alert. By automatically monitoring and detecting the roof leaks, the system can detect the roof leaks at an earlier stage, preventing further damages to the property and reducing the total costs of the roof leaks to the owner of the property.

Figure 1:
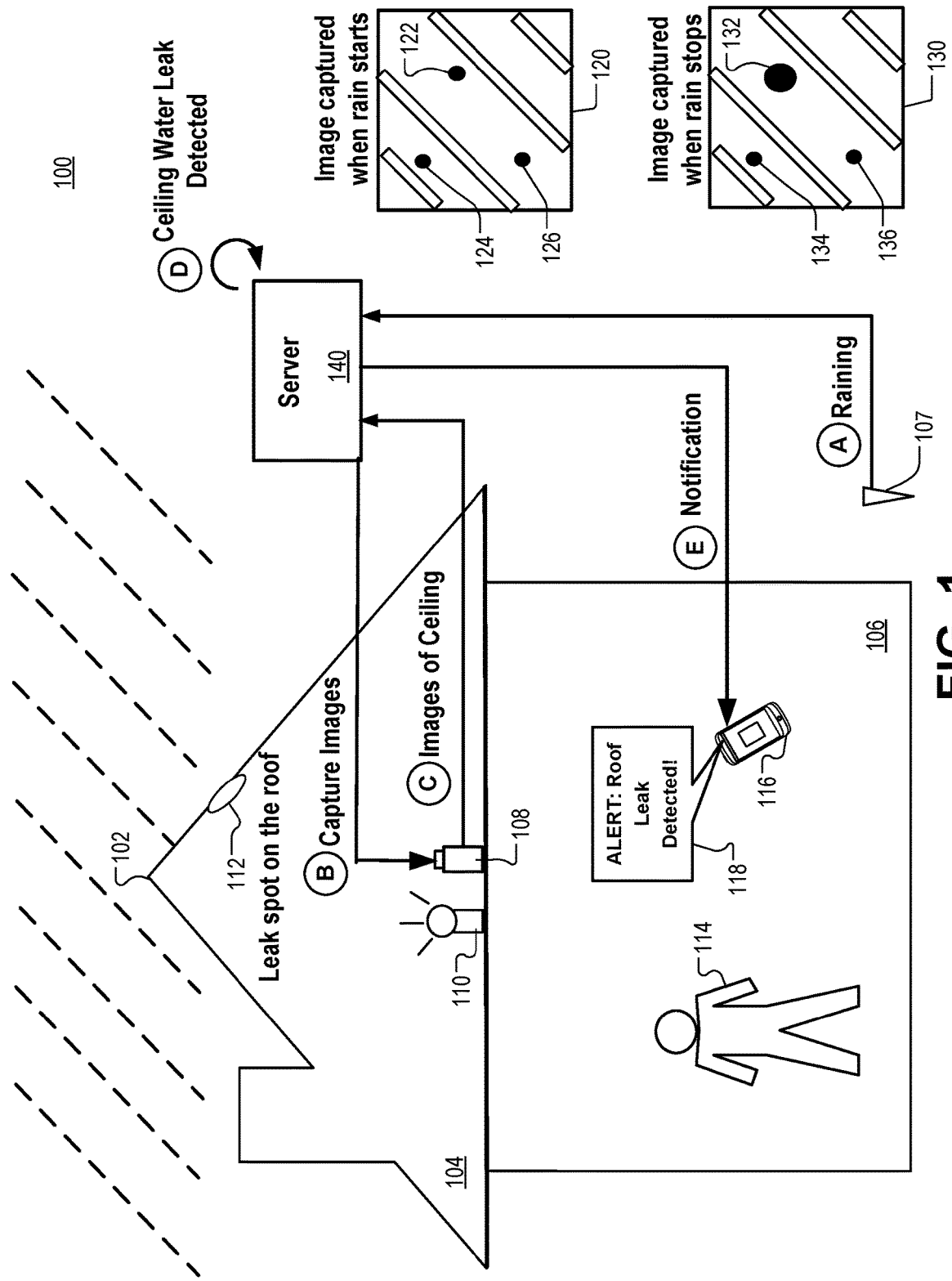
FIG. 1 is a diagram illustrating an example of a roof leaks detection system.

FIG. 1 is a diagram illustrating an example of a roof leaks detection system 100. The system 100 includes one or more sensors that monitor a property 102. The property 102 can be a residential property or a commercial property. The property can include an attic 104 that is above the main living space 106. The system can monitor the ceiling of the attic for potential roof leaks, e.g., leak spot 112. In some implementations, the property does not include an attic and the system can monitor the roof leaks directly from the main living space. For example, in a two story home that does not have an attic, the system can monitor the ceiling of a room on the second floor for roof leaks. The property 102 is monitored by sensors, such as a camera 108, and an environment sensor 107, and so on.

The camera 108 can be a video or a photographic camera or other type of optical sensing device configured to capture images. The camera 108 can be configured to capture images of the ceiling of the attic in order to monitor water droplets and/or dark spots that appear on the ceiling of the attic. The camera 108 can be configured to capture single, static images of the area or videos of the area. The camera 108 may be a high-resolution camera that can detect subtle changes in the ceiling, e.g., a 4K camera that can distinguish water droplets and dark spots on the ceiling of the attic from more than ten feet away. The camera 108 can be a wide view camera that captures a large visual field of view. For example, the camera 108 can be a 360 degree camera that has a 360 degree field of view of the entire ceiling of the attic 104.

The camera 108 may need additional light in order to capture high resolution images. In some implementations, the camera 108 can trigger integrated or external illuminators (e.g., a light 110 in the attic) to improve the image/video quality. In some implementations, the light 110 can trigger the camera 108 through the system 100 or by directly communicating a message to the camera 108. For example, when the light 110 is turned on, the camera 108 can be turned on subsequently. In some implementations, the camera 108 can be a waterproof camera and the light can be a waterproof light. In some implementations, the camera can be a night vision camera that can take high resolution images under low light or no light situations, and no additional lighting is required.

The camera 108 can operate according to preprogrammed instructions or according to instructions received from remote devices such as computers, sensors, portable electronic devices, and servers, etc. The camera 108 can be configured to operate in response to a triggering event, e.g., the rainstorm starting or ending, etc. The camera 108 can be programmed to capture images/videos at several time points over a period of time as described in more detail below. For example, the camera 108 can be programmed to capture an image when the rain starts and to capture another image when the rain stops. As another example, the camera 108 can be programmed to capture an image at a predetermined interval, e.g., every five hours, since the rain starts and until the rain stops. The camera 108 can enter a low-power mode when not capturing images. The camera 108 can be powered by internal replaceable batteries, or power outlets from the property 102.

In some implementations, the system 100 can include multiple cameras installed in the attic. Each camera can take an image/video of a portion of the ceiling of the attic. The system can analyze the multiple images/videos simultaneously taken by the multiple cameras. For example, the system can combine the multiple images into a wide-view image by performing an image stitching algorithm. The system can then determine water leaks by analyzing the wide-view image. In some implementations, a drone that includes a camera can scan the ceiling and can be programmed to obtain images/videos of the ceiling.

The captured images/videos are compared and analyzed for detecting roof leaks. The camera 108 can process the captured images/video using an integrated image analysis engine. In some implementations, the camera 108 can communicate with a server or other electronic device through a wired or wireless communication network. The server or the other electronic device is equipped with an image analysis engine that can compare and analyze the images/videos. The camera 108 can transmit image/video data through the wired or wireless communication network to the server or the other electronic devices.

The environment sensor 107 can be configured to detect a precipitation event around the property 102. The property can be configured with one or more environment sensors at different locations around the property. The environment sensor 107 can be placed outside or near the property 102. The environment sensor 107 can be implemented in various shapes and sizes. The environment sensor 107 can monitor various environment conditions including the presence of rain, snow, sunshine, fog, and so on. The environment sensor can include one or more of the following: a temperature sensor, a water sensor, a rain sensor, a humidity sensor, a wind sensor, a light sensor, a camera, or an imaging device and so on. For example, a rain sensor can detect a signal that indicates the precipitation situation around the property. The rain sensor can monitor a particular time when the rain starts and a particular time when the rain stops.

The environment sensor 107 can communicate sensor data directly to the camera 108 through a wired or wireless communication network. For example, the environment sensor 107 can detect that a humidity level is above a particular threshold, and can send the humidity level to the camera. The environment sensor 107 can communicate sensor data with a server 140 through a wired or wireless communication network.

The server 140 can be, for example, one or more computer systems, server systems, or other computing devices that are located at the property 102 or remotely from the property 102. The server 140 can be configured to process the sensor data from the environment sensor 107, process the captured images or videos from the camera 108, and determine whether there is a water leak on the ceiling. In some implementations, the server 140 can be a cloud computing platform.

After receiving the sensor data from the environment sensor 107, the server 140 can subsequently determine a triggering event based on the sensor data. In some implementations, the server 140 can determine the triggering event based on the sensor data and other environment information obtained by the server 140 e.g., weather forecast information. For example, the server 140 can receive weather forecast information that indicates there is a 90% chance of raining at the current moment. The server 140 also receives a high humidity level from the humidity sensor. The server 140 can determine that it is raining outside.

The server 140 can automatically send a triggering signal to the camera 108 through a wired or wireless communication network. For example, the server 140 can send a triggering signal to instruct the camera to capture an image of the ceiling of the attic.

An example scenario of roof leaks detection works as follows.

In stage (A), the server 140 monitors weather related events and determines whether precipitation is occurring. A precipitation event can include an environmental event that may trigger leaks on the roof. For example, a precipitation event can be in the forms of drizzle, rain, snow, ice pellets, and hail, etc. The server 140 can monitor precipitation using one or more of the following information: weather forecast information, sensor data captured from an environment sensor 107 installed on or near the property 102, etc. The server 140 can determine that the precipitation is to occur or already occurred at a particular time. The server can also determine that the precipitation is to end or already ended at a particular time.

In stage (B), when the rain starts or is predicted to start soon, the server 140 sends a command to the camera 108 to take a first image 120 of the ceiling of the attic 104 of the property 102. In some implementations, the server 140 sends a command to the light 110 to turn on the light 110, and the camera 108 is subsequently turned on by receiving a signal from the light 110. With the light on, the camera 108 takes a first image 120 of the ceiling at a first time point. The first time point can be just before the rain starts or shortly after the rain started. After taking the first image, the camera 108 can enter a low-power mode or can turn off to save energy. The light 110 can turn off as well.

The first image 120 is a high resolution image capturing the status of the ceiling when the rain starts. The first image 120 can be a color image or a grayscale image. The first image can include dark spots on the ceiling, e.g., the dark spots 122, 124, 126. Some dark spots are wet spots due to a leak spot on the roof. Some dark spots are permanent, and are not related to roof leaks, e.g., spots naturally from the material of the ceiling. For example, wood materials that are used to construct a ceiling can have several or many dark spots. As another example, paint stains, or spots from previous old water leaks can appear as dark spots in the image.

Different from the permanent dark spots, the dark spots from a roof leak can change during precipitation. As more water comes through the leak spot, the dark spot can change over time. The dark spot can become bigger, darker, or can change to a different shape. For example, the dark spot 122 captured in camera image 120 corresponds to a leak spot 112 on the roof. As more water comes through the leak spot 112, the dark spot 122 may become a bigger dark spot 132 as shown in a second image 130 captured when the rain stops. Alternatively or in combination, if enough water comes through the leak spot 112, water drops can form and drop, and the image 130 may include one or more water drops.

In contrast, the dark spots that are not related to roof leaks usually remain unchanged during a precipitation event. For example, the dark spot 124 may correspond to a natural spot in the wood material. The dark spot 124 captured in the first image 120 when the rain starts is similar to the dark spot 134 captured in the second image 130 when the rain stops.

After a period of raining time, or when the rain stops, the server 140 sends a command to the camera 108 to take a second image 130 of the ceiling of the attic 104 of the property 102. The server can determine when the rain stops by monitoring weather events using sensor data collected by the environment sensor 107. For example, based on the rain sensor data, the server can determine that the rain has stopped five minutes ago. The server can be configured to take the second image 130.

In some implementations, after taking the initial first image, the server 140 can take a sequence of images at a predetermined interval. For example, the server 140 can take an image of the ceiling every four hours until the rain stops or after a predetermined number of images have been taken. This is useful if the rain lasts a long period of time. The server can obtain early detection of the potential roof leaks before the rain stops, and can notify the user to take actions in response to the roof leak detection.

The second image 130 captures the same field of view of the ceiling as the first image 120. The second image 130 includes a dark spot 132 that corresponds to the leak spot 112 on the roof, and two other dark spots 134 and 136. The second image 130 captures the ceiling that is illuminated with similar lighting conditions as the ceiling in the first image 120. In some implementations, when there is a window in the attic and the natural lighting has changed compared with the condition when capturing the first image 120, the light 110 can be automatically adjusted to compensate for the change of the natural lighting.

In stage (C), the camera can communicate the two images to the server through a network. The network can be any communication infrastructure that supports the electronic exchange of data between the camera 108 and the server. For example, the network may include a local area network (LAN). The network may be any one or a combination of wireless or wired networks and may include any one or more of Ethernet, Bluetooth, Bluetooth LE, Z-wave, ZigBee, or Wi-Fi technologies, etc.

In stage (D), the server 140 can process the first image 120 and the second image 130 using an image analysis engine and can detect a water leak on the ceiling. In some implementations, the server 140 can communicate with a remote server that includes the image analysis engine. In some implementations, the image analysis engine can be integrated with the processing system of the camera 108 and the two images can be processed on processors of the camera to generate a roof leak detection result.

The image analysis engine can include an image analysis algorithm implemented in one or more computers. The image analysis engine can compare the first image 120 and the second image 130 to determine whether there is a dark spot that corresponds to a roof leak. In some implementations, the image analysis algorithm can include a machine learning algorithm and/or a computer vision algorithm to more accurately discriminate a changing dark spot from other features in the image, e.g., the permanent dark spots. More details of the image analysis engine are described in connection with FIG. 2.

For example, the image analysis engine can determine whether a pair of dark spots has expanded. The image analysis engine can determine the difference between the number of black pixels in the dark spot 132 (e.g., 100 pixels) and the number of black pixels in the dark spot 122 (e.g., 50 pixels). The image analysis engine can determine the difference in the number of black pixels (e.g., 50 pixels) is larger than a predetermined threshold, e.g., 50% of the number of pixels in dark spot 122 (e.g., 25 pixels). If the image analysis engine determines that the difference satisfies the predetermined threshold, the image analysis engine can determine that the dark spot 132 corresponds to a roof leak spot.

In some implementations, other conditions in the attic can result in a change in the dark spot. For example, the appearance of a dark spot can change due to shadow, lighting, animals in the attic (e.g., a moth, a bug, or a mouse), or stains caused by a child, and so on. The image analysis engine can be configured to differentiate a change in the dark spot from a roof leak and a change due to other sources that are not related to a roof leak.

In some implementations, the image analysis engine can use a machine learning algorithm to differentiate a dark spot caused by a physical object and an actual leakage dark spot. A physical object refers to a tangible object that might cause the dark spot. For example, if an insect is on the ceiling of the attic, the image analysis engine can use a machine learning algorithm to identify the object as an insect and therefore the image analysis engine will not report the dark spot as a potential leak spot.

In some implementations, the image analysis engine can use a computer vision algorithm to differentiate a dark spot caused by an intangible object and an actual leakage dark spot. An intangible object, for example, shadows from sunlight can cause a change in the appearance of an image, resulting in a dark spot that is not related to leakage, or resulting in a change of the appearance of an actual leakage dark spot. The image analysis engine can use a computer vision algorithm to remove the change from the image, e.g., by filtering out the shadows that may appear as a dark spot.

For example, the server 140 can be configured to take the second image 130 as input and use an image analysis engine to process the second image 130. The image analysis engine can use a machine learning algorithm to detect whether there exists a physical object in the image 130. Alternatively or in combination, the image analysis engine can use a computer vision algorithm to process the image 130, e.g., removing shadows from the image 130 by filtering the image. The image analysis engine can compare the processed version of the second image 130 with the first image 120 captured prior to precipitation and can detect a water leak on the ceiling.

In some implementations, the server 140 can capture a sequence of images during precipitation, and the image analysis engine can compare the two or more images in the sequence of images and determine potential dark spots that are related to roof leaks. In some implementations, the server 140 can capture two or more videos during precipitation. The image analysis engine can determine a roof leak by comparing the two or more videos.

In some implementations, instead of or in combination with monitoring dark spots, the server 140 can monitor water drops from the ceiling of the attic or room. The server 140 can use the camera 108 to capture a video of the ceiling while it rains outside. The light 110 and the camera 108 can stay on during the recording until the rain stops or until a predetermined period of time has passed. The server can analyze the video using the image analysis engine to detect water drops from the ceiling. In some implementations, the server can detect water drops while the camera 108 is recording the video, e.g., when the image analysis engine is integrated with the camera 108. In some implementations, the server can monitor both water drops and dark spots in the captured images and/or videos.

In some implementations, an attic can include a window, i.e., a skylight installed on the roof. The first and second image captured by the camera can include a portion or all of the window. The server 140 can be configured to distinguish between events happening outside the window, e.g., water drops from rain outside the window, a falling leaf, etc., and a water drop inside the attic. For example, the image analysis engine can be configured to use a machine learning algorithm to detect a window in the attic and label the region of the window as a "window region". The image analysis engine can be configured to ignore a potential dark spot detected in the "window region". In this way, a water drop outside the skylight, or a leaf outside the window cannot be identified as a potential dark spot. Additionally or alternatively, the image analysis engine can be configured to ignore a water drop in the "window region." In this way, a water drop outside the skylight may not be detected as a water leak.

In stage (E), in response to determining there is a water leak on the ceiling, the server 140 can send an alert message to a user device or another remote server. The server 140 can communicate with the mobile device 116 through a cellular network or wireless data network, through a WAN or LAN, through Wi-Fi, or through another wired or wireless communication link. The notification can be, for example, an SMS text message, an e-mail, a message displayed by an application executing on the mobile device 116, or another notification or message sent to the device 116.

For example, as illustrated in FIG. 1, the server 140 can send an alert message 118 "ALERT: Roof Leak Detected!" to a user device 116 of a user 114 living in the property. In some implementations, when the user is not present in the property the user can still receive the alert message through the communication network.

In some implementations, the alert message can further include an image or a video of the ceiling of the attic. In the image or the video, the detected potential dark spot or water drop is marked-up (e.g., circled) such that the user can review or confirm the leak, and can take actions in response to the leak. For example, the alert message can include a processed image of the image 130 that includes the suspected dark spot 132.

In some implementations, the alert message can further include two or more images captured at various times during the rain. The user can perform a visual comparison between the images to confirm the changes to a dark spot. For example, the alert message can include the image 120 and the image 130. The user can confirm the detected dark spot 132 by visually comparing the image 120 and the image 130.

In some implementations, the alert message can further include a video of the ceiling during precipitation. For example, the alert message can include a video that lasts for 10 seconds, and the video can correspond to a period of time when a suspected water drop occurs.

After receiving the alert message, the user 114 can take actions to prevent further damages to the property 102. For example, the user can inspect or fix the leak spot 112 in person, or ask for professional help if needed.

In some implementations, one or more of the steps of (A) to (E) can be performed by a portable electronic device (e.g., a smart phone). For example, a portable electronic device can send a triggering signal to the camera 108 and instruct the camera to take an image of the ceiling. In some implementations, one or more steps of (A) to (E) can be performed by a control unit installed in the property 102.

The system 100 can detect the roof leaks automatically and timely, and notifies a user immediately in response to a potential leak. Therefore, roof leaks can be detected when they are small and early, preventing further damages to the other interior parts of the property and reduces the total maintenance and repairing costs to the property owner.

Figure 2:
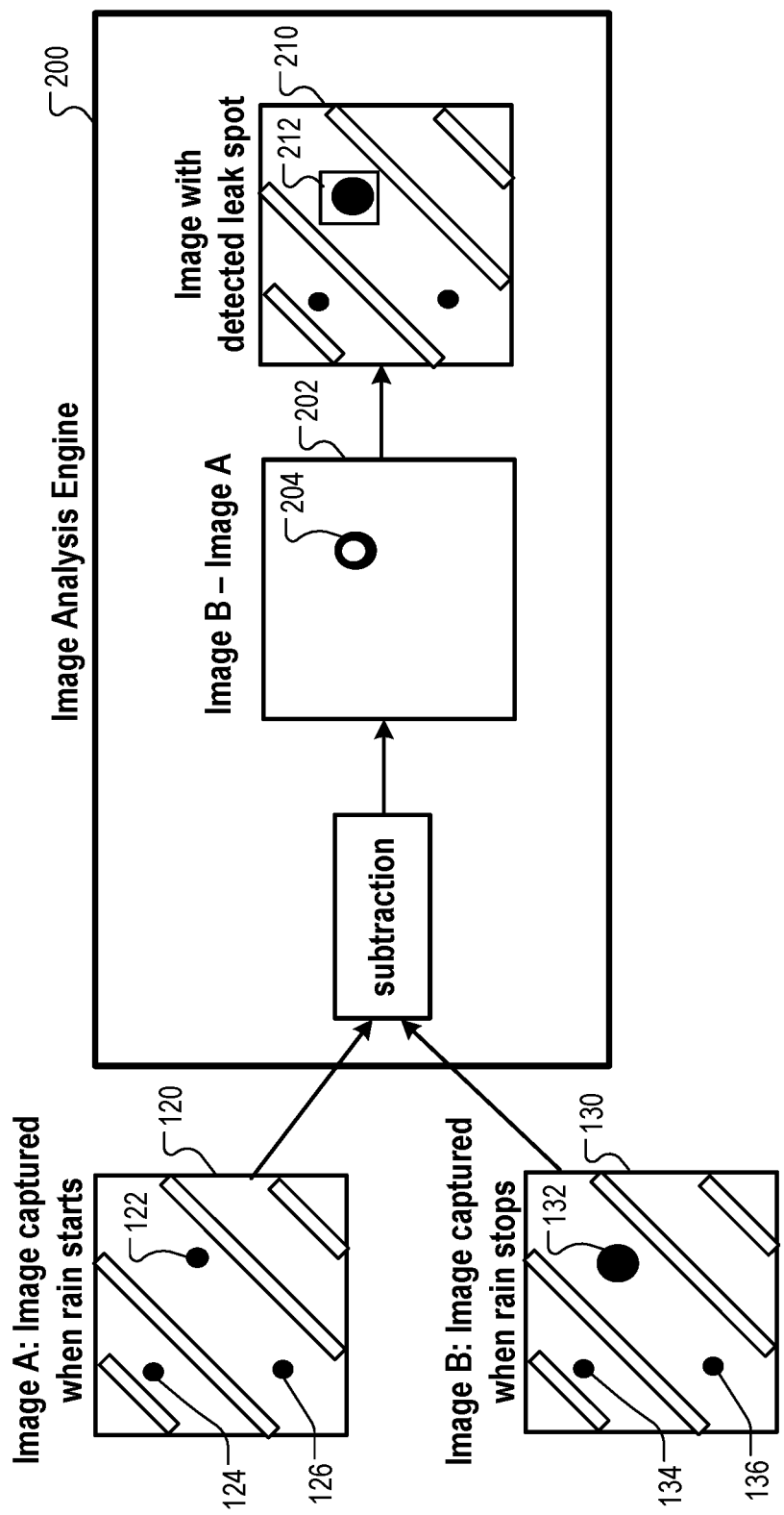
FIG. 2 is a diagram illustrating an example of an image analysis engine of the roof leaks detection system.

FIG. 2 is a diagram illustrating examples of an image analysis engine 200 of the roof leaks detection system 100. The image analysis engine 200 can be configured to analyze images captured by an image acquisition device (e.g., the camera 108) installed in the property 102. The image analysis engine 200 can be configured to compare the images and determine a potential roof leak spot on the roof of the property.

For example, the image analysis engine 200 can be configured to receive two or more images captured by the camera 108. Each image captures the status of the ceiling of the attic at a different time during a precipitation event. As shown in FIG. 2, image A (120) is an image captured when the rain starts and image B (130) is an image captured when the rain stops. The image analysis engine 200 can be configured to receive image A and image B as input and analyze the differences between image A and image B.

The image analysis engine 200 can include one or more processing devices configured to execute various image analysis processes, including the processes described herein.

In some implementations, the image analysis engine 200 can perform a subtraction operation to subtract image A from image B. In this example, image A and image B are registered and aligned with each other. Through the subtraction operation, the image analysis engine 200 can generate a difference image 202 that is equal to image B–image A. As described earlier, a dark spot that corresponds to a roof leak spot can change during a precipitation event, while other static objects in the image, such as permanent dark spots, do not change during the precipitation event. The difference image 202 can show the changes near the dark spot that corresponds to a roof leak. For example, the ring shaped object 204 in image 202 shows that the dark spot 122 in image 120 has grown bigger, which corresponds to the bigger dark spot 132 in the image 130.

The image analysis engine 200 can perform further analysis on the difference image 202 to detect the leak spot. For example, the image analysis engine can calculate the number of dark pixels in the image 202. The image analysis engine can count the number of pixels that is larger or smaller than a predetermined threshold value, e.g., lower than 100 in a grayscale image that has pixels ranging from 0 to 255. The image analysis engine can compare the number of pixels with a predetermined threshold value, e.g., 50 pixels. If the number of pixels is larger than the predetermined threshold value, this means the image B has changed significantly from image A. The image analysis engine can determine that there is a potential leak spot. If the number of pixels is smaller than the predetermined threshold value, this means the image B has little change from image A, and the differences may correspond to noise in the captured images. The image analysis engine can determine that there is not a potential leak spot.

In some implementations, the image analysis engine 200 can determine the location of the leak spot. In particular, the image analysis engine 200 can label the location of the leak spot in one of the input images to the image analysis engine 200.

For example, the image analysis engine 200 can label the location of the leak spot on the image B, and can generate an image 210 with the detected leak spot. After determining the ring shaped object 204 that corresponds to the change in the dark spot 122 and 132, the image analysis engine can generate a bounding box 212 that tightly surrounds the ring shaped object 204. The location of the bounding box 212 can include the coordinate of the top-left corner and the width and length of the bounding box 212. The image analysis engine can overlay the bounding box 212 on the image 130 to generate the image 210 with the detected leak spot.

In some implementations, the system 100 can send the image 210 with the detected leak spot label 212 to a user device 116. The user 114 of the user device 116 can visually inspect the detected leak spot in the image 210. When physically inspecting the potential leak spot in the attic, the user 114 can conveniently locate the physical leak spot on the ceiling with the help of the labeled image 210.

In some implementations, the image analysis engine 200 can use a computer vision algorithm that can process the images or videos captured during a precipitation event. For example, the image analysis engine can include a dark spot detection algorithm to detect the dark spots in an image or a video. As another example, the image analysis engine can include a dark spot change detection algorithm to detect the changes among the dark spots in two or more images. As another example, the image analysis engine can include a water drop detection algorithm to detect a water drop event that happens in a video.

The computer vision algorithm can include a machine learning algorithm that is previously trained using labeled training data. In such cases, the image analysis engine can access a trained model that has been trained using that labeled training data. The labeled training data can include images with leak spots and images without leak spots. In some implementations, the system 100 can include a training engine that trains a machine learning algorithm, and the training engine can include one or more computers that are specialized in training machine learning algorithms with training data. The machine learning algorithm can include one or more convolutional neural networks. The convolutional neural network can include many layers of linear and non-linear operations computations. The convolutional neural network can be trained to perform a particular computer vision task, such as detecting a dark spot, or detecting a water drop.

In some implementations, the image analysis engine 200 can reside on a computing device (e.g., a server) that is at a remote location with respect to the property 102 and the image acquisition device (e.g., the camera 108). The system 100 can send the input images (image A 120 and image B 130) through a wired or a wireless communication connection. The remote computing device can be specialized in performing the computer vision algorithms required by the image analysis engine 200. For example, the image analysis engine 200 can run a machine learning algorithm on a remote server that is equipped with Graphics Processing Units (GPUs), and the GPUs can perform the machine learning algorithm at a faster speed.

After generating a roof leak detection result, the image analysis engine can send the roof leak detection result (e.g., in the form of an alert message) to a server or a user device. In some implementations, the image analysis engine can include the image 210 with the labeled detected leak spot in the roof leak detection result. The image analysis engine can send the alert message with the labeled image to the server or the user device.

Figure 3:
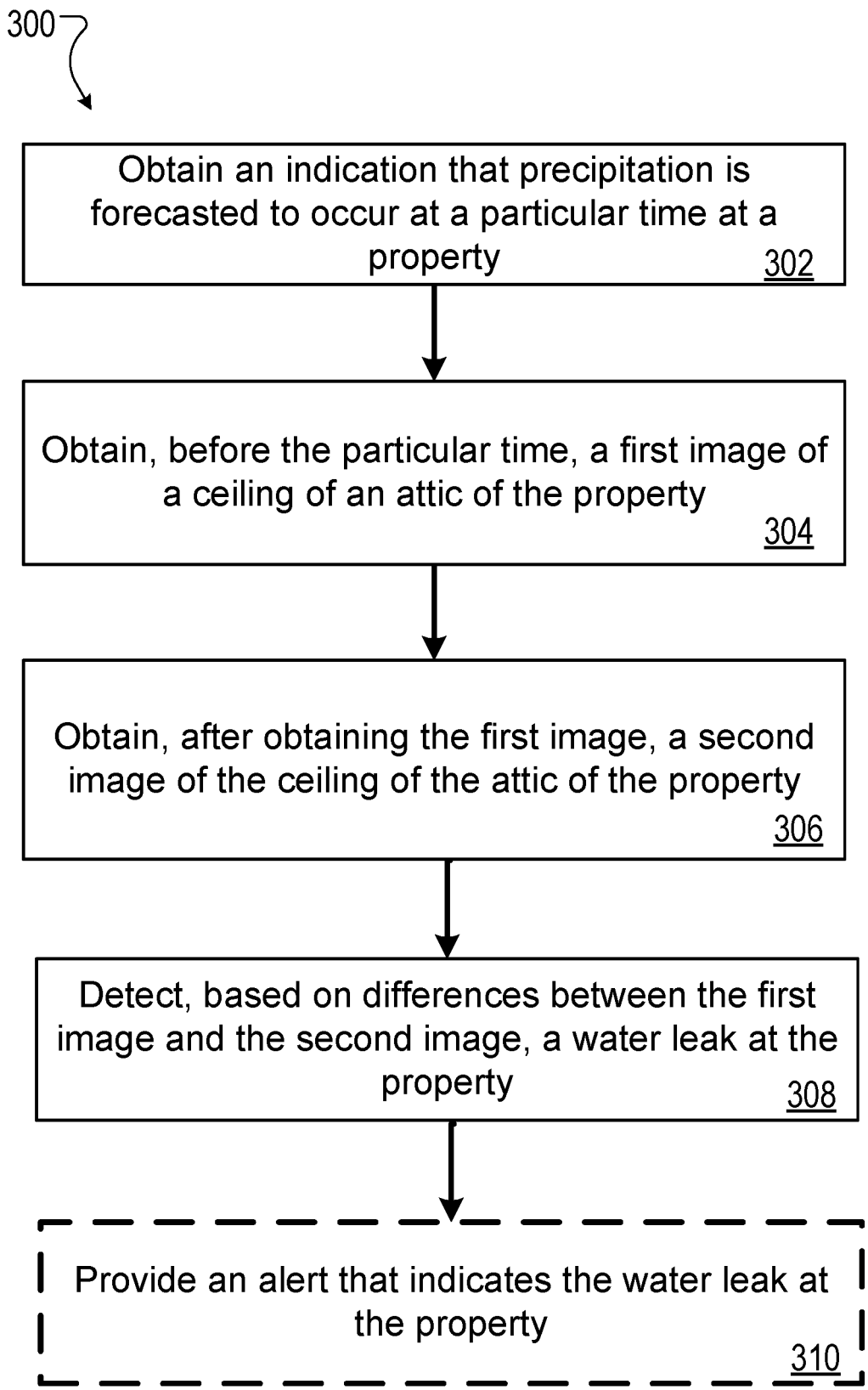
FIG. 3 is a flow chart illustrating an example of roof leak detection.

FIG. 3 is a flow chart illustrating an example of a process 300 for roof leaks detection. The process 300 can be performed by one or more computer systems, for example, the server 140, the portable electronic device 116, a control unit installed in the property, or a combination of these. In some implementations, some or all of the process 300 can be performed by the system 100, or by another computer system located at the monitored property 102 or at a remote location.

The system obtains an indication that precipitation is forecasted to occur at a particular time at a property (302). For example, the server 140 may receive a weather forecast from a weather reporting system, where the report indicates that rain is expected to start at 3 p.m. A precipitation event can include an environmental event that may trigger leaks on the roof. For example, a precipitation event can be in the forms of drizzle, rain, snow, ice pellets, and hail, etc. The system can obtain precipitation information from one or more environment sensors located near the property that is being monitored. Alternatively or in combination, the system can obtain precipitation information from a weather forecast database, and the precipitation information can include a predicted likelihood of a precipitation event. In some implementations, the system can combine environment sensor information and weather forecast information, and determine a particular time that the precipitation is going to occur at the property.

The precipitation information can include a particular time that the precipitation is about to happen at an area that includes the property. The particular time is a time that water has not penetrated a potential roof leak spot if a roof leak spot exists. The system is configured to monitor the status of the roof before the precipitation starts or soon after the precipitation has started.

For example, the system can receive weather forecast information that predicts a 99% chance of rainfall at 3:00 p.m. on a particular day. As another example, the system can receive data from a rain sensor, and the data indicates that rain is going to start in 5 minutes.

In some implementations, the system can obtain an indication that the precipitation has just started at the property. For example, the system can receive humidity data from a humidity sensor installed outside the property. The humidity data indicates that the rain started 3 minutes ago.

The system obtains, before the particular time, a first image of a ceiling of an attic of the property (304). For example, the server 140 may instruct the camera 108 to capture an image 120 of the ceiling of the attic 104. The system can monitor the status of the ceiling using an image acquisition device, such as a camera 108. Water leaks through a leak spot on the roof can first show up in the ceiling of an attic or the wall of a top floor room of the property. In some implementations, the system can obtain a first image of a ceiling of an attic of the property. In some implementations, the system can obtain a first image of a wall of a room that is located on the top floor of the property.

The system obtains the first image that is captured before the particular time. That is, the first image is an image before the precipitation starts and before the water penetrates through a potential leaking roof. For example, if the system receives weather forecast information that predicts a 99% chance of rainfall at 3:00 p.m. on a particular day, the system can obtain the first image at 2:55 p.m. on that day. The first image captured at 2:55 p.m. can indicate the status of the ceiling before the rain starts.

In some implementations, the first image can be a frame of a video. In some implementations, the system can take a video of the ceiling of the attic and video can start at a particular time and can last for a predetermined period of time. The video can include a static field of view of the attic in order to observe changes that happen over the predetermined period of time. Alternatively or in combination, the video can include a moving field of view of the attic such that the video can cover a large area of the ceiling.

The first image can be a high resolution image that can include details of the status of the ceiling. The system can use a high resolution camera to obtain a high resolution image. The system can use a light 110 to illuminate the ceiling. The light 110 can be synchronized with the camera such that they can be turned on or off together. The camera can be a waterproof camera. The light can be a waterproof light. The camera can be a wide view (e.g., 360 degree) camera such that the field of view covers a large portion of the ceiling.

The first image can include objects in an attic near the ceiling, such as long beams, one or more windows, dark spots, pipes, insulation materials, etc. Some dark spots in the first image can be permanent, e.g., the dark spots that naturally exist in the wood material that is used to construct the house. Some dark spots can result from a previous water leak. Some dark spots can be mold spots.

After obtaining the first image, the system obtains a second image of the ceiling of the attic of the property (306). The second image of the ceiling can capture the status of the ceiling after the precipitation has lasted for a period of time. For example, the system can capture a second image after it has rained for three hours. In some implementations, obtaining, after obtaining the first image, the second image of the ceiling of the attic of the property includes determining that the precipitation has stopped and based on determining that the precipitation has stopped, capturing the second image of the ceiling of the attic of the property. For example, the server 140 can determine, from weather information received from a weather reporting system, that the precipitation has stopped and, in response, the server 140 can capture a second image. In some implementations, the system can capture the second image at a predetermined interval from the time that the first image is captured. For example, the server 140 can instruct the camera 108 to take an image of the ceiling every four hours until the rain stops or after a predetermined number of images have been taken. This is useful if the rain lasts a long period of time. The server can obtain early detection of the potential roof leaks before the rain stops, and can notify the user to take actions in response to the roof leak detection.

As the rain continues, water can penetrate a leak spot on the roof, and this can result in changes that are observable on the ceiling. For example, a dark spot in the first image can change in the second image. The dark spot can become bigger, and/or can change to a different shape. As another example, for a new roof leak spot, a dark spot that does not exist in the first image can appear in the second image because the rain has penetrated through the leak spot and into the ceiling.

In some implementations, the second image can be a frame of a video. In some implementations, the system can take a second video of the ceiling after obtaining the first video. The system can take a second video when the precipitation stops or when the precipitation has lasted for a period of time. In some implementations, the system can take one video from the beginning of the precipitation until the precipitation stops or until a predetermined period of time has passed.

In some implementations, the second image or video can include a water drop from the ceiling. As more water comes through the roof leak spot, a water drop may form and can be captured by the second image or the second video.

The system detects, based on differences between the first image and the second image, a water leak at the property (308). The system can use an image analysis engine 200 to determine whether there is a water leak at the property. In some implementations, detecting, based on the differences between the first image and the second image, the water leak at the property includes comparing a size of a dark spot in the first image and the size of a corresponding dark spot in the second image, determining that a change of the size of the dark spot satisfies a leak criteria, and based on determining that the change of the size of the dark spot satisfies the leak criteria, determining that the dark spot corresponds to the water leak at the property. For example, the system can detect a dark spot 122 in the first image 120 and detect a corresponding dark spot 132 in the second image 130. The system can compare the size of a dark spot 122 in the first image 120 and the size of a corresponding dark spot 132 in the second image 130. If the change of the size of the dark spot is larger than a leak criteria, such as a predetermined threshold (e.g., 50% change in diameter, or 5 mm change in diameter), the system can determine that there is a water leak spot on the roof.

In some implementations, detecting, based on differences between the first image and the second image, a water leak at the property includes generating a difference image by subtracting the first image from the second image, performing analysis on the difference image, and detecting the water leak based on a result of the analysis on the difference image. For example, the system can generate the difference image 202 by subtracting the first image 120 from the second image 130. The system can calculate the number of dark pixels in the image 202. The system can compare the number of dark pixels with a predetermined threshold value, e.g., 50 pixels. If the number of pixels is larger than the predetermined threshold value, this means that the second image 130 has changed significantly from the first image 120. The image analysis engine can determine that there is a potential leak spot.

In some implementations, detecting, based on differences between the first image and the second image, a water leak at the property includes detecting a water drop in the second image and based on detecting the water drop in the second image, detecting the water leak at the property. For example, the system can detect a water drop in the second image (or a frame of a video). The system can use the image analysis engine 200 to compare the first image and the second image in order to detect a water drop from the ceiling. The image analysis engine can determine the existence of a water drop based on the color and shape of a water drop. In some implementations, the image analysis engine 200 can analyze a video that captures the process of a water drop dripping from the ceiling and can determine that a water drop happened during the precipitation event. In some implementations, the system can determine that there is a water drop in the second image and the system can determine there is a potential water leak at the spot of the water drop.

In some implementations, the system can detect a water leak based on both a change in a dark spot and a detection of a water drop. For example, the system can detect a dark spot that has grown bigger and can detect a water drop that drips from the same dark spot. The system can generate a detection result that indicates a water leak with high probability.

In some implementations, the system can detect a change between a dark spot in the first image and a corresponding dark spot in the second image. The system can determine that the change of the dark spot is caused by a physical object or an intangible object. In response, the system can determine that the dark spot does not correspond to the water leak at the property. For example, the physical object can be an insect. The system can detect the insect using a computer vision algorithm, including an object detector. The system can determine that the change of the dark spot is caused by the movement of the insect. Therefore, the system will not report the dark spot as a potential leak spot. As another example, the intangible object can be a shadow from sunlight. The shadows from sunlight can cause a change in the appearance of an image, resulting in a dark spot that is not related to leakage, or resulting in a change of the appearance of an actual leakage dark spot. The system can detect the shadow using a computer vision algorithm or use a computer vision algorithm to remove the change from the image, e.g., by filtering out the shadows that may appear as a dark spot. The system can determine that the change of the dark spot is caused by the change of the shadow. Therefore, the system will not report the dark spot as a potential leak spot.

In some implementations, the water leak detection result can include the total number of water leak spots in the property. For each water leak spot, the water leak detection result can include a value indicating the likelihood of a water leak at that spot. For example, the water leak detection result can include: water leak spot 1: 50%; water leak spot 2: 97%. The image analysis engine can generate the value indicating the likelihood of the water leak at each spot by analyzing the first image and the second image. In some implementations, the likelihood value can be generated by a machine learning algorithm implemented in the image analysis engine.

In some implementations, the water leak detection result can include a labeled image 210 of the ceiling of the attic. The image analysis engine 200 can generate a bounding box 212 of a detected dark spot or a detected water drop in the second image. The image analysis engine can generate the labeled image which includes the location of the detected water leak spot indicated by the bounding box.

In some implementations, the system provides an alert that indicates the water leak at the property (310). The system can send the alert to a server or a user device over a wired or wireless communication link. The alert is a notification that can be in the form of an SMS text message, a phone call, an e-mail, a message displayed by an application executing on a user device, etc. For example, the system can send an SMS message to a smart phone of a resident living in the property. The message can say "ALERT: Roof Leak Detected!"

In some implementations, the alert can further include an image or a link to the image of the ceiling of the attic. The user can visually inspect the image of the ceiling when the user receives the alert. In some implementations, the image in the alert can include a label that indicates the location of the water leak. For example, the alert can include a labeled second image 210 which includes a bounding box 212 around the detected leak spot. The user can easily identify the detected leak spot in the image. Based on the labeled image, the user can take further actions to inspect or fix the water leak in the ceiling.

Figure 4:
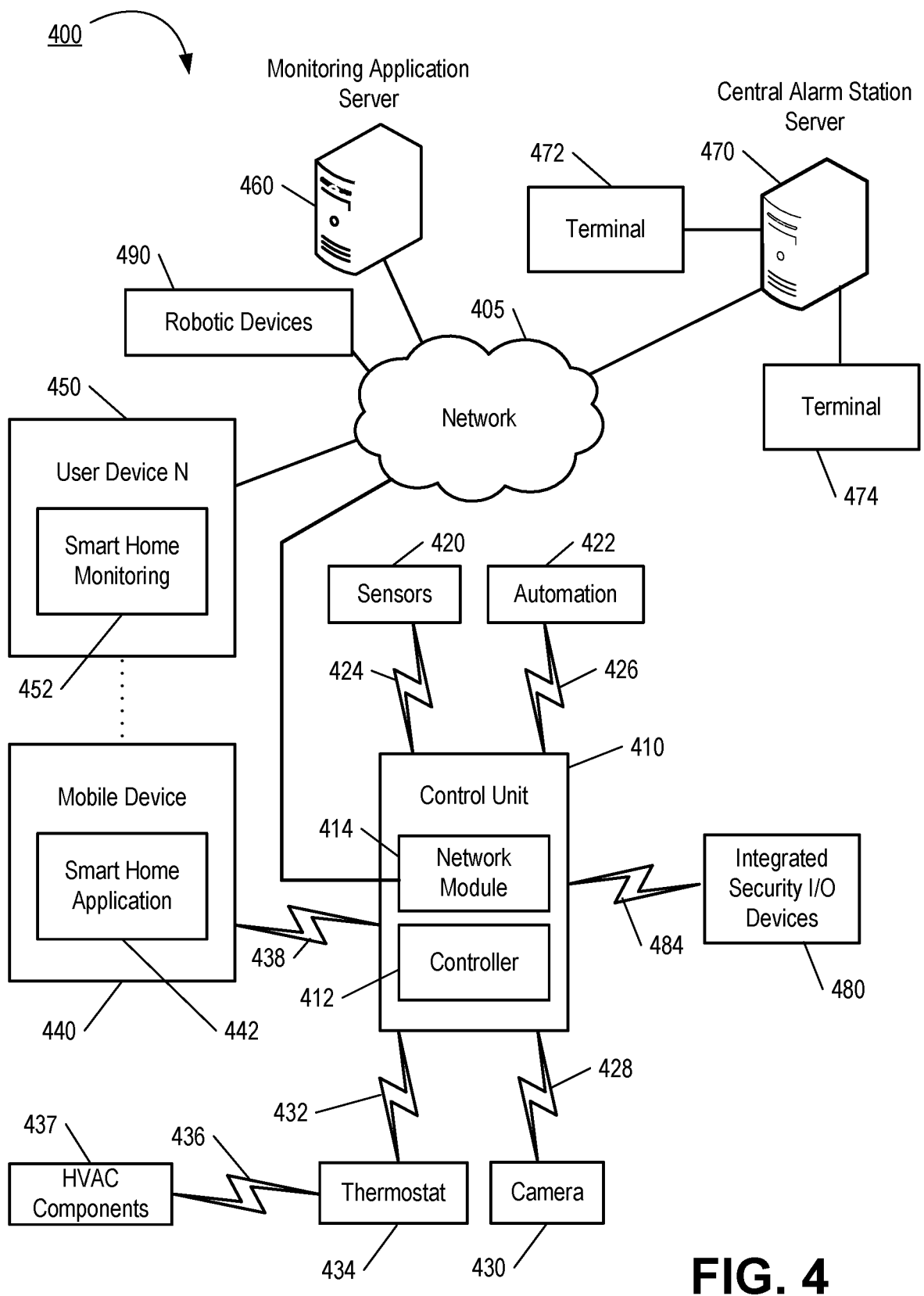
FIG. 4 is a diagram illustrating an example of a property monitoring system.

FIG. 4 is a diagram illustrating an example of a property monitoring system 400. The electronic system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, ZigBee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves close enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for temperature conditions or may determine and perform actions at the property by issuing commands to one or more of the adjustable textiles, possibly through the control unit 410.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 442. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, ZigBee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/ processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
obtaining, by a property monitoring system, data indicating that precipitation is forecasted to occur at a particular time at a property;
in response to obtaining the data indicating that the precipitation is forecasted to occur at the particular time, capturing, by a camera of the property monitoring system installed inside the property before the particular time, a first image of a ceiling of the property;
capturing, by the camera, a second image of the ceiling of the property at a predetermined time after the first image is captured, wherein the second image is a different image than the first image;
detecting, by the property monitoring system and using differences between the first image and the second image, a candidate water leak at the property, wherein the detecting comprises:
generating a difference image by subtracting the first image from the second image;
detecting the candidate water leak using the difference image;
detecting, using a machine learning model, a window region in the first image and the second image that corresponds to a window installed on the ceiling of the property;
determining whether the candidate water leak is in the window region in the first image and the second image; and
in response to determining that the candidate water leak at the property is not in the window region in the first image and the second image and detecting the candidate water leak at the property:
determining a likelihood that there is a water leak at a region that is different from the window region at the property using the first image and the second image; and
performing, by the property monitoring system, one or more actions for the property using the likelihood that there is a water leak at the property.

2. The method of claim 1, wherein performing the one or more actions comprises:
providing an alert that indicates the water leak at the property.

3. The method of claim 1, wherein detecting, using the differences between the first image and the second image, the candidate water leak at the property comprises:
comparing a size of a dark spot in the first image and the size of a corresponding dark spot in the second image;
determining that a change of the size of the dark spot satisfies a leak criterion; and
in response to determining that the change of the size of the dark spot satisfies the leak criterion, determining that the dark spot corresponds to the candidate water leak at the property.

4. The method of claim 1, wherein detecting, using the differences between the first image and the second image, the candidate water leak at the property comprises:
detecting a water drop in the second image using a shape of the water drop; and
in response to detecting the water drop in the second image, generating a water leak detection result that indicates the candidate water leak with high probability.

5. The method of claim 1, comprising:
detecting a change between a dark spot in the first image and a corresponding dark spot in the second image;
determining that the change of the dark spot is caused by a physical object or an intangible object that are not water; and
in response determining that the change of the dark spot is caused by the physical object or the intangible object, determining that the dark spot does not correspond to the water leak at the property.

6. The method of claim 5, wherein the physical object comprises an insect, wherein the intangible object comprises a shadow, wherein the method comprises:
detecting the physical object or the intangible object using a computer vision algorithm; and
determining that the change of the dark spot is caused by the physical object or the intangible object.

7. The method of claim 1, wherein capturing, by the camera, the second image of the ceiling of the property at the predetermined time after the first image is captured comprises:
determining that the precipitation has stopped; and
in response to determining that the precipitation has stopped, capturing the second image of the ceiling of the property.

8. A system comprising:
one or more computers and one or more storage devices storing instructions that are operable, when executed by the one or more computers, to cause the one or more computers to perform operations comprising:
obtaining, by a property monitoring system, data indicating that precipitation is forecasted to occur at a particular time at a property;
in response to obtaining the data indicating that the precipitation is forecasted to occur at the particular time, capturing, by a camera of the property monitoring system installed inside the property before the particular time, a first image of a ceiling of the property;
capturing, by the camera, a second image of the ceiling of the property at a predetermined time after the first image is captured, wherein the second image is a different image than the first image;
detecting, by the property monitoring system and using differences between the first image and the second image, a candidate water leak at the property, wherein the detecting comprises:
generating a difference image by subtracting the first image from the second image;
detecting the candidate water leak using the difference image;
detecting, using a machine learning model, a window region in the first image and the second image that corresponds to a window installed on the ceiling of the property;
determining whether the candidate water leak is in the window region in the first image and the second image; and
in response to determining that the candidate water leak at the property is not in the window region in the first image and the second image and detecting the candidate water leak at the property:
determining a likelihood that there is a water leak at a region that is different from the window region at the property using the first image and the second image; and
performing, by the property monitoring system, one or more actions for the property using the likelihood that there is a water leak at the property.

9. The system of claim 8, wherein performing the one or more actions comprises:
providing an alert that indicates the water leak at the property.

10. The system of claim 8, wherein detecting, using the differences between the first image and the second image, the candidate water leak at the property comprises:
comparing a size of a dark spot in the first image and the size of a corresponding dark spot in the second image;
determining that a change of the size of the dark spot satisfies a leak criterion; and
in response to determining that the change of the size of the dark spot satisfies the leak criterion, determining that the dark spot corresponds to the candidate water leak at the property.

11. The system of claim 8, wherein detecting, using the differences between the first image and the second image, the candidate water leak at the property comprises:
detecting a water drop in the second image; and
in response to detecting the water drop in the second image, detecting the candidate water leak at the property.

12. The system of claim 8, wherein the operations comprise:
detecting a change between a dark spot in the first image and a corresponding dark spot in the second image;
determining that the change of the dark spot is caused by a physical object or an intangible object that are not water; and
in response determining that the change of the dark spot is caused by the physical object or the intangible object, determining that the dark spot does not correspond to the water leak at the property.

13. The system of claim 12, wherein the physical object comprises an insect, wherein the intangible object comprises a shadow, the operations comprise:
detecting the physical object or the intangible object using a computer vision algorithm; and
determining that the change of the dark spot is caused by the physical object or the intangible object.

14. A non-transitory computer-readable medium storing software comprising instructions executable by one or more computers which, upon such execution, cause the one or more computers to perform operations comprising:
obtaining, by a property monitoring system, data indicating that precipitation is forecasted to occur at a particular time at a property;
in response to obtaining the data indicating that the precipitation is forecasted to occur at the particular time, capturing, by a camera of the property monitoring system installed inside the property before the particular time, a first image of a ceiling of the property;
capturing, by the camera, a second image of the ceiling of the property at a predetermined time after the first image is captured, wherein the second image is a different image than the first image;
detecting, by the property monitoring system and using differences between the first image and the second image, a candidate water leak at the property, wherein the detecting comprises:
generating a difference image by subtracting the first image from the second image;
detecting the candidate water leak using the difference image;
detecting, using a machine learning model, a window region in the first image and the second image that corresponds to a window installed on the ceiling of the property;
determining whether the candidate water leak is in the window region in the first image and the second image; and
in response to determining that the candidate water leak at the property is not in the window region in the first image and the second image and detecting the candidate water leak at the property:
determining a likelihood that there is a water leak at a region that is different from the window region at the property using the first image and the second image; and
performing, by the property monitoring system, one or more actions for the property using the likelihood that there is a water leak at the property.

15. The method of claim 1, wherein obtaining the data indicating that the precipitation is forecasted to occur at the particular time comprises:
obtaining the data indicating that the precipitation is forecasted to occur at the particular time from an environment sensor at the property.

16. The method of claim 1, wherein after capturing of the first image and before capturing of the second image, the camera is in a low-power mode that consumes less power than when the camera captures an image.

17. The method of claim 1, comprising:
after capturing the first image and before capturing the second image, detecting a change in natural lighting near the camera; and
adjusting a light for the camera to compensate for the change in the natural lighting.

18. The method of claim 1, wherein detecting the candidate water leak using the difference image comprises:
determining a number of pixels in the difference image that each satisfies a predetermined threshold pixel value; and
determining whether the number of pixels satisfies a threshold value.

19. The system of claim 8, wherein detecting the candidate water leak using the difference image comprises:
determining a number of pixels in the difference image that each satisfies a predetermined threshold pixel value; and
determining whether the number of pixels satisfies a threshold value.

20. The computer-readable medium of claim 14, wherein detecting the candidate water leak using the difference image comprises:
determining a number of pixels in the difference image that each satisfies a predetermined threshold pixel value; and
determining whether the number of pixels satisfies a threshold value.

* * * * *